United States Patent [19]

Ishii

[11] Patent Number: 4,987,352

[45] Date of Patent: Jan. 22, 1991

[54] BRUSHLESS MOTOR DRIVER

[75] Inventor: Toshihiko Ishii, Itami, Japan

[73] Assignee: Mitsubishi Denki Kabushiki Kaisha, Tokyo, Japan

[21] Appl. No.: 323,393

[22] Filed: Mar. 14, 1989

[30] Foreign Application Priority Data

Jun. 20, 1988 [JP] Japan .................................. 63-153089

[51] Int. Cl.⁵ .......................................... H02K 29/00
[52] U.S. Cl. ...................................... 318/254; 318/138
[58] Field of Search ................................ 318/254, 138

[56] References Cited

U.S. PATENT DOCUMENTS

| | | | |
|---|---|---|---|
| 4,385,265 | 5/1983 | Uzuka | 318/138 |
| 4,535,276 | 8/1985 | Yokobori | 318/138 |
| 4,608,524 | 8/1986 | Yokobori | 318/138 |

FOREIGN PATENT DOCUMENTS 58-33986 2/1983 Japan .
58-33987 2/1983 Japan .
58-33988 2/1983 Japan .
59-204485 11/1984 Japan .

Primary Examiner—Bernard Roskoski
Attorney, Agent, or Firm—Oblon, Spivak, McClelland, Maier & Neustadt

[57] ABSTRACT

In the inventive brushless motor driver, saturation voltage creating means is provided for creating a saturation voltage corresponding to a torque command, while current correcting means is provided for comparing the created saturation voltage with operating voltages of driving transistors to correct the amount of current in transistor drive control signals so that the operating voltages drop below the created saturation voltage. Thus, it is possible to drive the motor with a high efficiency and a low noise while preventing saturation of the driving transistors with respect to any torque command.

5 Claims, 4 Drawing Sheets

BRUSHLESS MOTOR DRIVER

BACKGROUND OF THE INVENTION

1. Field of the Invention

The present invention relates to a brushless motor driver applicable to an acoustic apparatus and an image apparatus and the like.

2. Description of the Background Art

FIG. 4 is a circuit diagram showing a conventional brushless motor driver. As shown in FIG. 4, a brushless motor 1 has three phase driving coils 2a, 2b and 2c and a rotor (not shown), and driving transistors Q21, Q22, Q25, Q26, Q29 and Q30 are provided for controlling feed with respect to the driving coils 2a, 2b and 2c. The driving transistors Q21, Q25 and Q29 arranged at an upper side are NPN transistors respectively, whose collectors are tied together to connect with a positive feed terminal 3 of a power source $V_{CC}$. On the other hand, the driving transistors Q22, Q26 and Q30 arranged at a lower side are NPN transistors respectively, whose emitters are tied together to connect with a reverse input terminal of a control amplifier A1 and ground (negative feed terminal) through a resistance R11. An emitter of the driving transistor Q21 is connected with a collector of the driving transistor Q22, and the node between the both transistors Q21 and Q22 is connected with the driving coil 2a. An emitter of the driving transistor Q25 is connected with a collector of the driving transistor Q26, and the node between the both transistors Q25 and Q26 is connected with the driving coil 2b. An emitter of the driving transistor Q29 is connected with a collector of the driving transistor Q30, and the node between the both transistors Q29 and Q30 is connected with the driving coil 2c.

Terminals 4 to 9 are provided for inputting sensor signals $H_U{}^+$, $H_U{}^-$, $H_V{}^+$, $H_V{}^-$, $H_W{}^+$ and $H_W{}^-$ as shown in FIG. 5 respectively, sensor signals $H_U{}^+$, $H_U{}^-$, $H_V{}^+$, $H_V{}^-$, $H_W{}^+$ and $H_W{}^-$ being produced by well known technique on the basis of rotating angle of the rotor. The sensor signals $H_U{}^+$, $H_V{}^+$, $H_W{}^+$ are 120 degrees out-of-phase each other, while the sensor signals $H_U{}^-$, $H_V{}^-$, and $H_W{}^-$ are 180 degrees out-of-phase with the sensor signals $H_U{}^+$, $H_V{}^+$ and $H_W{}^+$ respectively. The terminals 4 and 5 are respectively connected with bases of NPN transistors Q1 and Q2 making up a differential transistor pair, and emitters of the transistors Q1 and Q2 are tied together to connect with ground through a constant current source 10. The terminals 6 and 7 are respectively connected with bases of NPN transistors Q4 and Q5 making up a differential transistor pair, and emitters of the transistors Q4 and Q5 are tied together to connect with ground through a constant current source 11. The terminals 8 and 9 are respectively connected with bases of NPN transistors Q7 and Q8 making up a differential transistor pair, and emitters of the transistors Q7 and Q8 are tied together to connect with ground through a constant current source 12.

A collector of the transistor Q1 is connected with a collector and a base of a PNP transistor Q3 and a base of a PNP transistor Q12, and emitters of the transistors Q3 and Q12 are connected with the positive feed terminal 3 respectively, thus the transistors Q3 and Q12 make up a current mirror circuit. A collector of the transistor Q4 is connected with a collector and a base of a PNP transistor Q6 and a base of a PNP transistor Q11, and emitters of the transistors Q6 and Q11 are connected with the positive feed terminal 3 respectively, thus the transistors Q6 and Q11 make up a current mirror circuit. A collector of the transistor Q7 is connected with a collector and a base of a PNP transistor Q9 and a base of a PNP transistor Q10, and emitters of the transistors Q9 and Q10 are connected with the positive feed terminal 3 respectively, thus the transistors Q9 and Q10 make up a current mirror circuit. Collectors of the transistors Q2 and Q9 are tied together, and collectors of the transistors Q5 and Q3 are tied together while collectors of the transistors Q8 and Q6 are tied together. A collector of the transistor Q10 is connected with ground through a resistance R1, and a collector of the transistor Q11 is connected with ground through a resistance R2 while a collector of the transistor Q12 is connected with ground through a resistance R3.

In the above circuit, a current corresponding to the one obtained by adding a current flowing in the transistor Q1 and a current flowing in the transistor Q5 flows the resistance R3 through the transistors Q3 and Q12 making up the current mirror circuit, and a voltage developed by a voltage drop across the resistance R3 can be outputted from a node N1 as an output voltage for U phase. Similarly, a current corresponding to the one obtained by adding a current flowing in the transistor Q4 and a current flowing in the transisor Q8 flows the resistance R2 through the transistors Q6 and Q11 making up the current mirror circuit, and a voltage developed by a voltage drop across the resistance R2 can be outputted from a node N2 as an output voltage for V phase. Further, a current corresponding to the one obtained by adding a current flowing in the transistor Q7 and a current flowing in the transistor Q2 flows the resistance R1 through the transistors Q9 and Q10 making up the current mirror circuit, and a voltage developed by a voltage drop across the resistnace R1 can be outputted from a node N3 as an output voltage for W phase. Incidentally, a waveform synthetic circuit 13 consists of the terminals 4 9, to the transistors Q1 to Q12, the resistances R1 to R3 and the constant current sources 10 to 12.

The node N1 developed the output voltage for U phase is connected with both bases of a PNP transistor Q13 and an NPN transistor Q14, and the node N2 developed the output voltage for V phase is connected with both bases of a PNP transistor Q15 and an NPN transistor Q16, while the node N3 developed the output voltage for W phase is connected with both bases of a PNP transistor Q17 and an NPN transistor Q18. Emitters of the transistors Q13, Q15 and Q17 tied together are connected with the positive feed terminal 3 through a constant current source 14, and collectors of the transistors Q13, Q18 and Q17 are respectively connected with bases of the driving transistors Q22, Q26 and Q30 arranged at lower side. Resistances R7, R8 and R9 are connected between collectors and emitters of the driving transistors Q22, Q26 and Q30 respectively. Thus, acitvities of the transistors Q13, Q15 and Q17 are controled on the basis of the output voltage of the nodes N1, N2 and N3 respectively to selectively supply a current of the constant current source 14 to the bases of the driving transistors Q22, Q26 and Q30 and the resistances R7, R8 and R9, so that the activities of the driving transistors Q22, Q26 and Q30 can be controled.

On the other hand, emitters of the transistors Q14, Q16 and Q18 are tied together to connect with ground through a constant current source 15. A collector of the transistor Q14 is connected with a base and a collector of a PNP transistor Q19 and a base of a PNP transistor Q20, and emitters of the transistors Q19 and Q20 are connected with the positive feed terminal respectively, thus the transistors Q19 and Q20 consist of a current mirror circuit. A collector of the transistor 020 is connected with a base of the driving transistor Q21 while being connected with an emitter of the driving transistor Q21 through a resistance R4. A collector of the transistor Q16 is connected with a base and a collector of a PNP transistor Q23 and a base of a PNP transistor Q24, and emItters of the transistors Q23 and Q24 are connected with the positive feed terminal 3 respectively, thus the transistors Q23 and Q24 consist of a current mirror circuit. A collector of the transistor Q24 is connected with a base of the driving transistor Q25 while being connected with an emitter of the driving transistor Q25 through a resistance R5. A collector of the transistor Q18 is connected with a base and a collector of a PNP transistor Q27 and a base of a PNP transistor Q28, and emitters of the transistors Q27 and Q28 are connected with the positive feed terminal 3, thus the transistors Q27 and Q28 consist of a current mirror circuit. A collector of the transistor Q28 is connected with a base of the driving transistor Q29 while being connected with an emItter of the driving transistor Q29 through a resistance R6. Thus activates of the transistors Q14, Q16 and Q18 are controlled on the basis of the output voltage of the nodes N1, N2 and N3 respectively to selectively supply a current absorbed by the constant current source 15 to the transistors Q19, Q23 and Q27, to thereby selectively supply a current corresponding to the current flowing in the transistors Q19, Q23 and Q27 to the bases of the driving transistors Q21, Q25 and Q29 and the resistances R4, R5 and R6 through the transistors Q20, Q24 and Q28, so that the activates of the driving transistors Q21, Q25 and Q29 can be controled.

In the control amplifier A1, a torque command $V_T$ is applied to a nonreverse input terminal thereof from a terminal 16. The control amplifier A1 acts to adjust amount of current $I_{CTL}$ flowing in each of the constant current sources 14 and 15 so that a voltage $R_F$ across the resistance R11 is the same with the voltage of the torque command $V_T$. Incidentally, the resistnace 10 is provided for setting a DC-gain of the control amplifier A1 in cooperation with the resistance R11.

The operation of the conventional brushless motor driver having the above structure will be explained below.

The sensor signals $H_U^+$, $H_U^-$, $H_V^+$, $H_V^-$, $H_W^+$, and $H_W^-$ as shown in FIG. 5 are applied to the terminal 4 to 9 of the waveform synthetic circuit 13 in relation to the rotating angle $\theta_E$ of the rotor. As a result, a current $I_O$ of the constant current source 10 is delivered to the transistors Q3 and Q9 in the manner of proportioning to the base-to-emitter voltages of the transistors Q1 and Q2 making up the differential transistor pair. Further, a current $I_O$ of the constant current source 11 is delivered to the transistors Q6 and Q3 in the manner of proportioning to the base-to-emitter voltages of the transistors Q4 and Q5 making up the differential transistor pair. Moreover, a current $I_O$ of the constant current source 12 is delivered to the transistors Q9 and Q6 in the manner of proportioning to the base-to-emitter voltages of the transistors Q7 and Q8 making up the differential transistor pair. Thus, the current corresponding to the one obtained by adding the current flowing in the transistor Q1 and the current flowing in the transistor Q5 flows the resistance R3 through the transistors Q3 and Q12 making up the current mirror circuit, to thereby set the potential of the node N1. Further, the current corresponding to the one obtained by adding the current flowing in the transistor Q4 and the current flowing in the transistor Q8 flows the resistance R2 through the transistors Q6 and Q11 making up the current mirror circuit, to thereby set the potential of the node N2. Moreover, the current corresponding to the one obtained by adding the current flowing in the transistor Q7 and the current flowing in the transistors Q2 flows the resistance R1 through the transistors Q9 and Q10 making up the current mirror circuit, to thereby set the potential of the node N3.

Consequently, the potential of the node N1 is "H" when the voltages of the sensor signals $H_U^+$, $H_U^-$, $H_V^+$ and $H_V^-$ have the relation of $H_U^+ > H_U^-$, $H_V^- > H_V^+$ (namely, the rotating angle $\theta_E$ is within the range from 0° to 120°), while being "L" when the voltages of the sensor signals $H_U^+$, $H_U^-$, $H_V^-$ and $H_V^+$ have the relation of $H_U^+ < H_U^-$, $H_V^- < H_V^+$ (namely, the rotating angle $\theta_E$ is within the range from 180° to 300°). When the level of the node N1 is "H", the transistor Q14 conducts to supply the current corresponding to the current flowing in the transistor Q14 to the base of the driving transistor Q21 and the resistnace R4 through transistor Q19 and Q20 making up the current mirror circuit, so that the driving transistor Q21 is conducted. On the other hand, when the level of the node N2 is "L", the transistor Q13 conducts to supply a current to the base of the driving transistor Q22 and the resistnace R7, so that the driving transistor Q22 is conducted.

Similarly, the potential of the node N2 is "H" when the voltages of the sensor signals $H_V^+$, $H_V^-$, $H_W^+$ and $H_W^-$ have the relation of $H_V^+ > H_V^-$, $H_W^- > H_W^+$ (namely, the rotating angle $\theta_E$ is within the range from 120° to 240°), so that the driving transistor Q25 is conducted through the transistors Q16, Q23 and Q24. On the other hand, the potential of the node N2 is "L" when the voltages of the sensor signals $H_V^+$, $H_V^-$, $H_W^+$ and $H_W^-$ have the relation of $H_V^+ < H_V^-$, $H_W^- < H_W^+$ (namely, the rotating angle $\theta_E$ is within the range from 0° to 60° and 300° to 360°), so that the driving transistor Q26 is conducted through the transistors Q15.

Similarly, the potential of the node N3 is "H" when the voltages of the sensor signals $H_W^+$, $H_W^-$, $H_U^+$ and $H_U^-$ have the relation of $H_W^+ > H_W^-$, $H_U^- > H_U^+$ (namely, the rotating angle $\theta_E$ is within the range from 240° to 360°), so that the driving transistor Q29 is conducted through the transistor Q18, Q27 and Q28. On the other hand, the potential of the node N3 is "L" when the voltages of the sensor signals $H_W^+$, $H_W^-$, $H_U^+$ and $H_U^-$ have the relation of $H_W^+ < H_W^-$, $H_U^- < H_U^+$ (namely, the rotating angle $\theta_E$ is with in the range from 60° to 180°), so that the driving transistor Q30 is conducted through the transistor Q17.

Thus, the driving transistors Q21, Q25 and Q29 arranged at the upper side and the driving transistors Q22, Q26 and Q30 arranged at the lower side are sequentially conducted by switching every rotating angle 120° on the basis of the sensor signals $H_U^+$, $H_U^-$, $H_V^+$, $H_V^-$, $H_W^+$ and $H_W^-$, whereby the current sequentially flows to driving coils 2a, 2b and 2c so as to be obtained a rotating magnetic field for producing a turning effort.

A table of energized state will be shown below.

| energized state | energized driving transistor | energized driving coil | direction of current | rotating angle |
|---|---|---|---|---|
| 1 | Q21, Q26 | 2a, 2b | ① | 60° |
| 2 | Q21, Q30 | 2a, 2c | ② | 120° |
| 3 | Q25, Q30 | 2b, 2c | ③ | 180° |
| 4 | Q25, Q22 | 2a, 2b | ④ | 240° |
| 5 | Q29, Q22 | 2a, 2c | ⑤ | 300° |
| 6 | Q29, Q26 | 2b, 2c | ⑥ | 360° |

The motor is driven by repeating the above energized state 1 to 6. FIG. 6 shows the current inflow-outflow state of the brushless motor 1 in U phase, V phase and W phase.

In the above brushless motor driver, the currents $I_{CTL}$ of the constant current sources 14 and 15 are adjusted by the control amplifier A1 so that a driving current corresponding to the torque command $V_T$ flows to the driving coils 2a, 2b, and 2c. Namely, when the voltage of the torque command $V_T$ rises, the currents $I_{CTL}$ of the constant current sources 14 and 15 are increased by the operation of the control amplifier A1, whereby the base currents of the driving transistors Q21, Q22, Q25, Q26, Q29 and Q30 are increased to increase the driving current flowing in the driving coils 2a, 2b and 2c. The driving current causes the voltage $R_F$ to rise by flowing in the resistance R11. When the voltage $R_F$ becomes the same with the voltage of the torque command $V_T$, the increase of the current $I_{CTL}$ by the control amplifier A1 is ceased for supplying the driving current corresponding to the torque command $V_T$ to the driving coils 2a, 2b and 2c. Similarly, when the voltage of the torque command $V_T$ reduces, the currents $I_{CTL}$ of the constant current sources 14 and 15 are decreased by the operation of the control amplifier A1, whereby the base currents of the driving transistors Q21, Q22, Q25, Q26, Q29 and Q30 are decreased to decrease the driving current flowing in the driving coils 2a, 2b and 2c. The driving current causes the voltage $R_F$ to reduce by flowing in the resistance R11. When the voltage $R_F$ becomes the same with the voltage of the torque command $V_T$, the decrease of the current $I_{CTL}$ by the control amplifier A1 is ceased for supplying the driving current corresponding to the torque command $V_T$ to the driving coils 2a, 2b and 2c.

However, such a conventional brushless motor driver has the following disadvantages. Namely, since the driving current flowing in the motor 1 depends on only the voltage of the torque command $V_T$ and the voltage $R_F$ across the resistance R11, the driving transistors Q21, Q22, Q25, Q26, Q29 and Q30 always enter into a saturation area irrespective of the value of the torque command $V_T$, to thereby deteriorate a running efficiency and make noise.

SUMMARY OF THE INVENTION

The present invention is directed to a brushless motor driver.

The inventive brushless motor driver comprises a brushless motor having a rotor and driving coils for polyphase; control signal producing means for producing transistor drive control signals per each phase on the basis of the rotating angle of the rotor; means for applying a torque command; current adjusting means for adjusting an amount of current in the transistor drive control signals on the basis of the torque command; a group of driving transistors, each of the driving transistors having a control electrode for driving the rotor by controling feed with respect to the driving coils on the basis of the transistor drive control signals applied to each of the control electrodes; saturation voltage creating means for creating a saturation voltage corresponding to the torque command; and current correcting means for comparing the saturation voltage created by the saturation voltage creating means with an operating voltage of each the driving transistor to correct the amount of current in the transistor drive control signals so that the operating voltage drops below the saturation voltage created by the saturation voltage creating means.

Accordingly, a principal object of the present invention is to provide a brushless motor driver which can drive the motor with a high efficiency and a low noise while preventing saturation of driving transistors with respect to any torque command.

According to the inventive brushless motor driver, the saturation voltage corresponding to the torque command is created and compared with the operating voltage of each of the driving transistors to correct the amount of current in the transistor drive control signals so that the operating voltage drops below the created saturaion voltage, to thereby be able to drive the motor with a high efficiency and a low noise while preventing saturation of driving transistors with respect to any torque command.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
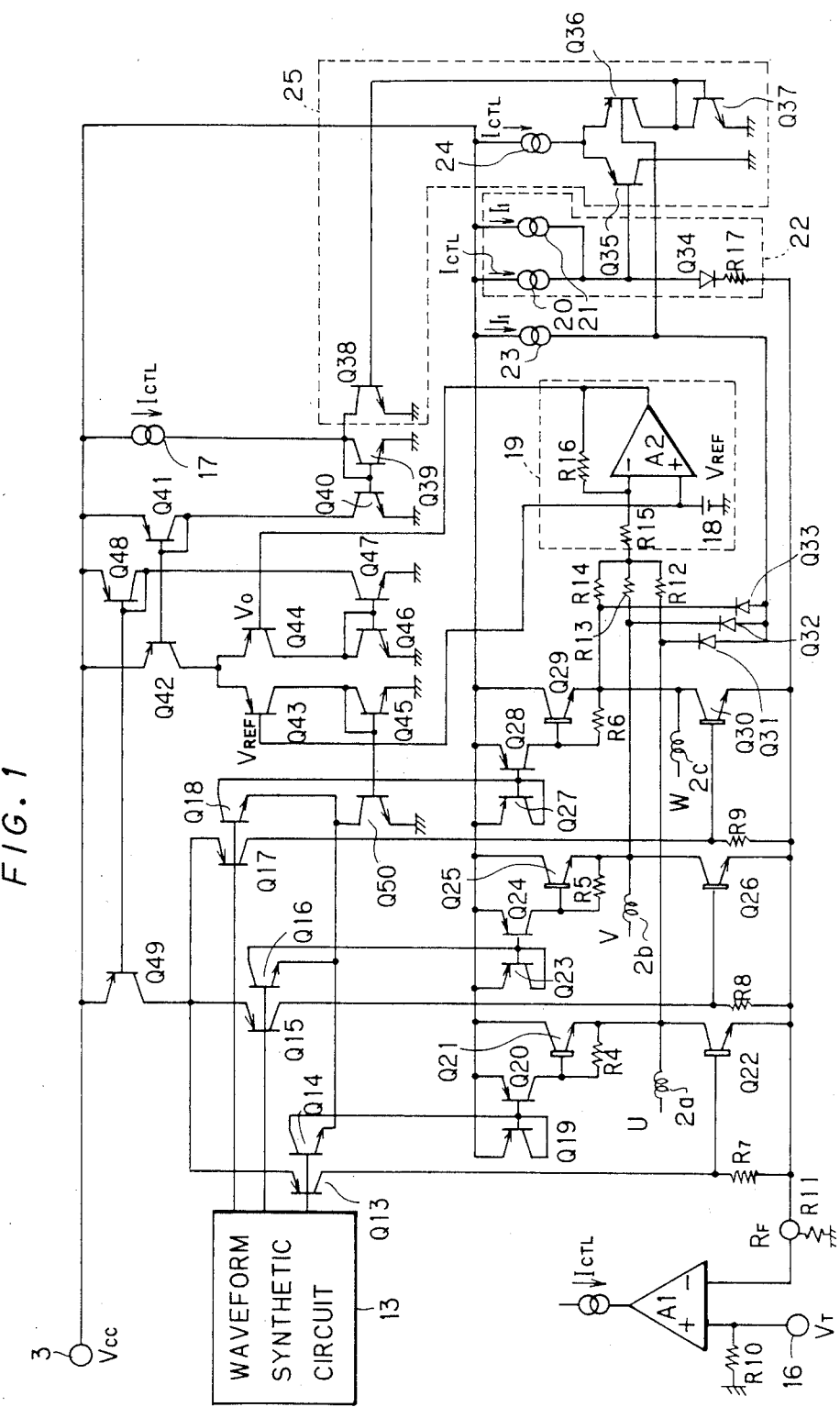
FIG. 1 is a circuit diagram showing a brushless motor driver according to an embodiment of the present invention.

FIG. 1 is a circuit diagram showing a brushless motor driver according to an embodiment of the present invention. In FIG. 1, the same reference numerals as in FIG. 4 designate identical or equivalent parts.

Figure 4:
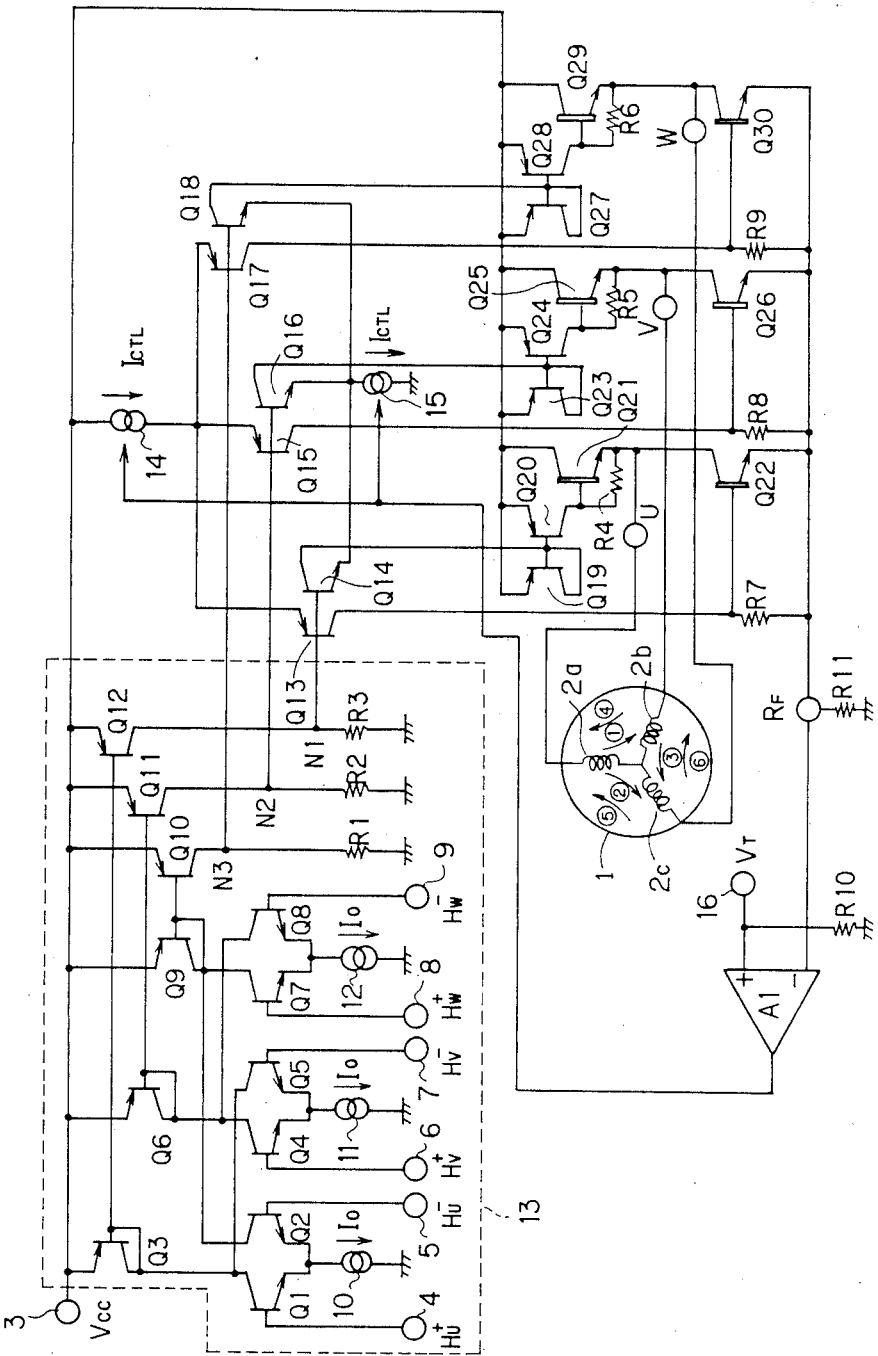
FIG. 4 is a circuit diagram showing a conventional brushless motor driver.
Figure 5:
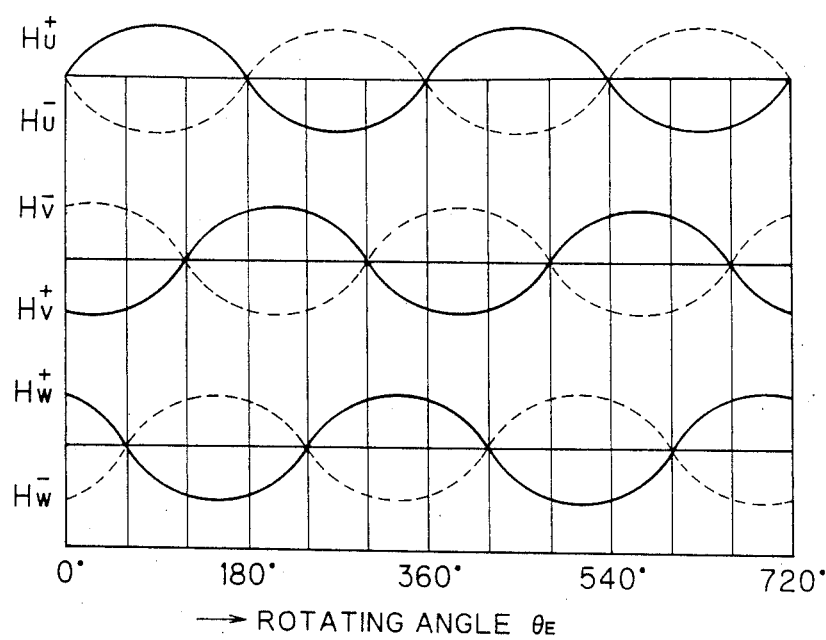
FIG. 5 is a waveform diagram of sensor signals.
Figure 6:
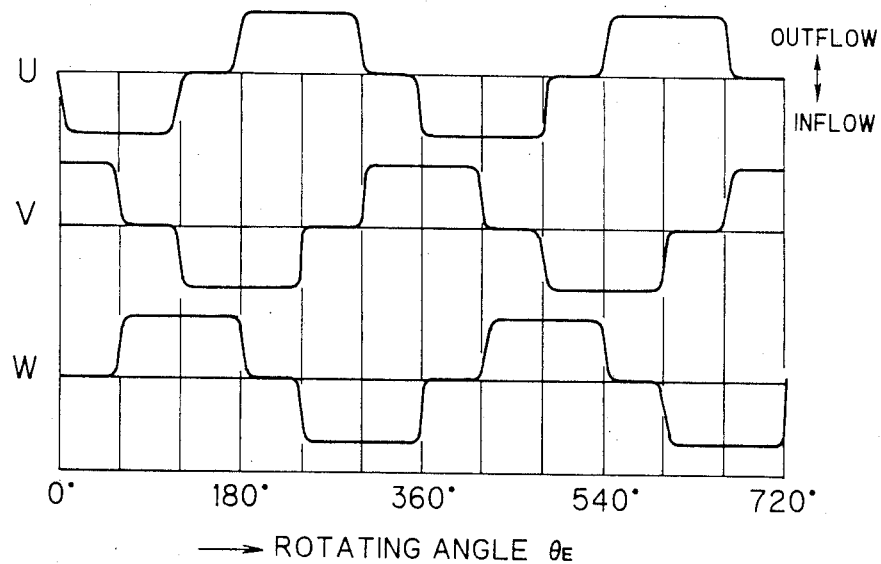
FIG. 6 is a diagram showing a relation between a rotating angle $\theta_E$ and an inflow-outflow state of currents flowing in U phase, V phase and W phase.

In the brushless motor driver, a PNP transistor Q49 in lieu of the constant current source 14 in FIG. 4 is connected to emitters of the transistors Q13, Q15 and Q17, while an NPN transistor Q50 in lieu of the constant current source 15 in FIG. 4 is connected to emitters of the transistors Q14, Q16 and Q18. A constant current source 17, in which an amount of a current $I_{CTL}$ is controlled by the control amplifier A1, is further provided, and a current distributing circuit which consists of transistors Q39 to Q48 is also provided between the constant current source 17 and the transistors Q49 and Q50.

Namely, one end of the constant current source 17 is connected with the positive feed terminal 3 while another end thereof is connected with a collector and a base of an NPN transistor Q39 and a base of an NPN transistor Q40. Emitters of the transistors Q39 and Q40 are connected with ground respectively, thus the transistors Q39 and Q40 make up a current mirror circuit. A collector of the transistor Q40 is connected with a collector and a base of a PNP transistor Q41 and a base of a PNP transistor Q42, while emitters of the transistors Q41 and Q42 are connected with the positive feed terminal 3 respectively, thus the transistors Q41 and Q42 make up a current mirror circuit. A collector of the transistor Q42 is connected with emitters of PNP transistors Q43 and Q44 making up a differential transistor pair. A reference voltage $V_{REF}$ is applied to a base of the transistor Q43 from a power source 18, while an output voltage $V_O$ of an error amplifier A2 is applied to a base of the transistor Q44, so that a current flowing in the transistor Q42 may be distributed to the transistors Q43 and Q44 according to the voltages $V_{REF}$ and $V_O$. A collector of the transistor Q43 is connected with a collector and a base of an NPN transistor Q45 and a base of the NPN transistor Q50, while emitters of the transistors Q45 and Q50 are connected with ground respectively, thus the transistors Q45 and Q50 make up a current mirror circuit. A collector of the transistor Q44 is connected with a collector and a base of an NPN transistor Q46 and a base of an NPN transistor Q47, While emitters of the transistors Q46 and Q47 are connected with ground respectively, thus the transistors Q46 and Q47 make up a current mirror circuit. A collector of the transistor Q47 is connected with a collector and a base of a PNP transistor Q48 and a base of the PNP transistor Q49, while emitters of the transistors Q48 and Q49 are connected with the positive feed terminal 3 respectively, thus the transistors Q48 and Q49 make up a current mirror circuit. In the above circuit structure, a current corresponding to a current supplied to the transistor Q39 from the constant current source 17 flows the transistor Q42 through the transistors Q40 and Q41, and a current flowing in the transistor Q42 is distributed to the transistors Q43 and Q44 according to the voltages $V_{REF}$ and $V_O$. Thus a current corresponding to a current flowing in the transistor Q43 flows in the transistor Q50 through the transistor Q45, while a current flowing in the transistor Q44 flows in the transistor Q49 through the transistors Q46, Q47 and Q48.

An amplification circuit 19 consists of an error amplifier A2, a power source 18 for generating a reference voltage $V_{REF}$, and resistances R15 and R16. The reference voltage $V_{REF}$ is also inputted in a non-reverse input terminal of the error amplifier A2 from the power source 18. In a reverse input terminal of the error amplifier A2, a potential (a motor driving output voltage for U phase) of a node between the driving transistors Q21 and Q22 is inputted through resistances R12 and R15, and a potential (a motor driving output voltage for V phase) of a node between the driving transistors Q25 and Q26 is inputted through resistances R13 and R15, while a potential (a motor driving output voltage for W phase) of a node between the driving transistors Q29 and Q30 is inputted through resistances R14 and R15, respectively. The error amplifier A2 produces the voltage $V_O$ by amplifying the difference between the reference voltage $V_{REF}$ and the motor driving output voltage with the ratio of the resistance R16 to the resistance R15, and supplies the voltage $V_O$ to the base of the transistor Q44 so that the sum of the motor driving output voltages becomes the same with the reference voltage $V_{REF}$.

A saturation voltage creating circuit consists of constant current sources 20 and 21, a diode Q34, and a resistance R17.

One end of the constant current source 20 for supplying the current $I_{CTL}$ and one end of the constant current source 21 for supplying a current $I_1$ are connected with the positive feed terminal 3 respectively, while another ends of the constant current sources 20 and 21 are connected with an anode of the diode 34 respectively, and a cathode of the diode 34 is connected with the emitters of the driving transistors Q22, Q26 and Q30 through the resistance R17.

On the other hand, a constant current source 23 and diodes Q31, Q32 and Q33 are provided for detecting operating voltages (collector-to-emitter voltages) of the driving transistors Q22, Q26 and Q30 arranged at the lower side. Namely, one end of the constant current source 23 for supplying a current $I_1$ is connected with the positive feed terminal 3, while another end of the constant current source 23 is connected with anodes of the diodes Q31, Q32 and Q33, and cathodes of the diodes Q31, Q32 and Q33 are connected with the collectors of the driving transistors Q22, Q26 and Q30 respectively.

Further, a current correcting circuit 25 consists of transistors Q35 to Q38, and a constant current source 24 for correcting the base currents of the driving transistors Q21, Q22, Q25, Q26, Q29 and Q30. Namely, one end of the constant current source 24 for supplying a current $I_{CTL}$ is connected with the positive feed terminal 3, while another end of the constant current source 24 is connected with emitters of PNP transistor Q35 and Q36 making up a differential transistor pair. A base of the transistor Q35 is connected with a node between the constant current source 20 and the diode Q34, while a base of the transistor Q36 is connected with a node between the constant current source 23 and the diodes Q31, Q32 and Q33. A collector of the transistor Q35 is connected with ground while a collector of the transistor Q36 is connected with a collector and a base of an NPN transistor Q37 and a base of an NPN transistor Q38. Emitters of transistors Q37 and Q38 are connected with ground respectively, while collector of the transistor Q38 is connected with a collector of the transistor Q39, thus the transistors Q37 and Q38 make up a current mirror circuit.

Figure 2:
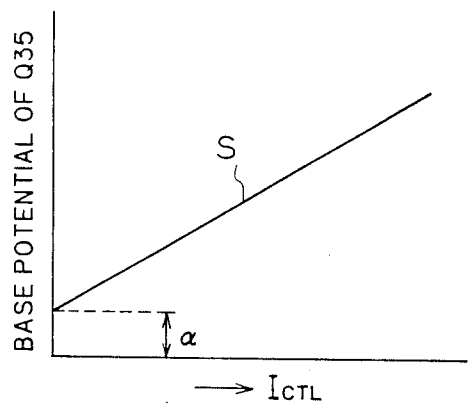
FIG. 2 is a characteristic diagram showing a relation between a current $I_{CTL}$ and a base potential of a transistor Q35.

Now let us consider a base potential of the transistor Q35. The base potential of the transistor Q35 is the sum of the voltage $R_F$ across the resistance R11, the voltage across the resistance R17, and the voltage across the diode Q34. The base potential has a characteristic shown by a solid line S with respect to the current $I_{CTL}$. In FIG. 2, reference numeral $\alpha$ designates a rising component of the base potential on the basis of the current $I_1$ supplied from the constant current source 21. The rising component is given by the following equation:

$$\alpha = \frac{KT}{q} \ln \frac{I_1}{I_S} + R17 \times I_1$$

where K indicates the Boltzman constant, T the absolute temperature, q the electric charge, and $I_S$ the reverse saturation current of the diode Q34. The rising component $\alpha$ is set for creating the saturation voltage which is slightly higher than the actual saturation voltage of the driving transistors.

On the other hand, a base potential of the transistor Q36 is the sum of the voltage $R_F$ across the resistance R11, the operating voltage of the driving transistor Q22, Q26 or Q30, and the voltage across the diode Q31, Q52 or Q33.

In comparison between the base potentials of the transistors Q35 and Q36, since the voltages $R_F$ are cancelled out each other and the voltage across the diode A31, Q32 or Q33 is also cancelled out with the voltage across the diode Q34, the saturation of the driving transistor is practically detected by the voltage across the resistance R17. Namely, when the operating voltage of the driving transistor drops below the voltage across the resistance R17 by the saturation of the driving transistor, the base potential of the transistor Q36 becomes less than the base potential of the transistor Q35, whereby the current $I_{CTL}$ of the constant current source 24 is divided into the transistor Q36 on the basis of the differential characteristic of the transistors Q35 and Q36. Thus, with the operation of the transistors Q37 and Q38 making up the current mirror circuit, a current corresponding to a current flowing in the transistor Q36 is absorbed from the constant current source 17 into ground through the transistor Q38.

The operation of the brushless motor driver having the above structure will be explained below.

First, it will be explained about the operation in a case where voltage of middle points in motor driving waveforms specified by the motor driving output voltages for U~W phase are equal to the reference voltage $V_{REF}$, and the driving transistors Q21, Q22, Q25, Q26, Q29 and Q30 are not in the saturation state. In this case, the same voltage with the reference voltage $V_{REF}$ is applied to the base of the transistor Q44 as the output voltage $V_O$ of the error amplifier A2, while the reference voltage $V_{REF}$ is applied to the base of the transistor Q43 from the power source 18, and hence the current flowing in the transistor Q42 is divided with the ratio 1:1 for supplying to the transistors Q43 and Q44. Further, in the non-saturation state of the driving transistors Q22, Q26 and Q30, the base potential of the transistor Q36 is higher than the base potential of the transistor Q35, and hence all the current $I_{CTL}$ of the constant current source 24 flows to the transistor Q35, to thereby prevent the current $I_{CTL}$ of the constant current source 17 from being absorbed by the transistor Q38. Accordingly, the current corresponding to the current $I_{CTL}$ flowing in the transistor Q39 flows to the transistor Q42 through the transistors Q40 and Q41, and the current flowing in the transistor Q42 is divided with the ratio 1:1 for supplying to the transistors Q43 and Q44, whereby the current corresponding to the current flowing in the transistor Q43 flows to the transistor Q50 through the transistor Q45, while the current corresponding to the current flowing in the transistor Q44 flows to the transistor Q49 through the transistors Q46, Q47 and Q48. Thus, the base currents corresponding to the torque command $V_T$ are supplied to the driving transistors Q21, Q22, Q25, Q26, Q29 and Q30, whereby the driving currents corresponding to the torque command $V_T$ are supplied to the driving coils 2a, 2b and 2c.

In the aforementioned state, when the driving transistors are saturated, the operating voltages of the driving transistors Q22, Q26 and Q30 arranged at the lower side drop, whereby the base potential of the transistor Q36 drops below the base potential of the transistor Q35 corresponding to the created saturation voltage. Consequently, a part of the current $I_{CTL}$ of the constant current source 24 flows to the transistor Q36, whereby the current corresponding to the current flowing in the transistor Q36 is absorbed through the transistor Q37 by the transistor Q38 from the constant current source 17. As a result, the current supplied to the transistor Q39 from the constant current source 17 decreases to cause the currents of the transistors Q49 and Q50 to decrease, whereby the base currents of the driving transistors Q21, Q22, Q25, Q26, Q29 and Q30 decrease to prevent the driving transistors from saturating.

Further, in the aforementioned motor driving state, the sum of the motor driving output voltages for U~W phases is adjusted so as to correspond with the referential voltage $V_{REF}$ by the amplification circuit 19 and the transistors Q43 and Q44 making up the differential circuit. Namely, if the sum of the motor driving output voltages becomes higher than the referential voltage $V_{REF}$, the increased voltage is amplified by the amplification circuit 19 to cause the base potential $V_O$ of the transistor Q44 to drop, whereby the current flowing in the transistor Q50 decreases while the current flowing in the transistor Q49 increases on the basis of the differential characteristic of the transistors Q43 and Q44. Consequently, the base currents of the driving transistors Q21, Q25 and Q29 arranged at the upper side decrease to cause the operating voltages (collector-to-emitter voltages) of the driving transistors Q21, Q25 and Q29 to rise, while the base currents of the driving transistors Q22, Q26 and Q30 arranged at the lower side increase to cause the operating voltages (collector-to-emitter voltages) of the driving transistors Q22, Q26 and Q30 to drop, whereby the motor driving output voltages of U~W phases drop. Conversely, if the sum of the motor driving output voltages becomes lower than the referential voltage $V_{REF}$, the decreased voltage is amplified by the amplification circuit 19 to cause the base potential $V_O$ of the transistor Q44 to rise, whereby the current flowing in the transistor Q50 increases while the current flowing in the transistor Q49 decreases on the basis of the differential characteristic of the transistors Q43 and Q44. Consequently, the base currents of the driving transistors Q21, Q25 and Q29 arranged at the upper side increase to cause the operating voltages of the driving transistors Q21, Q25 and Q29 to drop, while the base currents of the driving transistors Q22, Q26 and Q30 arranged at the lower side decrease to cause the operating voltages of the driving transistors Q22, Q26 and Q30 to rise, whereby the motor driving output voltages of U~W phases rise. Thus, the sum of the motor driving output voltages for U~W phases is adjusted so as to correspond with the referential voltage $V_{REF}$.

Figure 3:
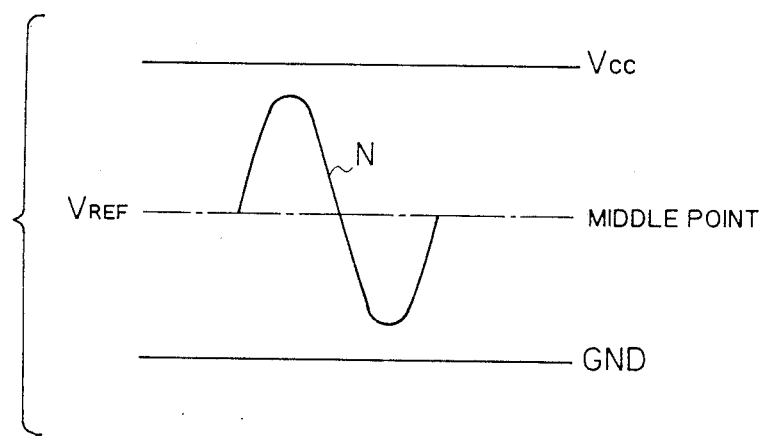
FIG. 3 is a diagram showing a motor driving waveform.

FIG. 3 shows a motor driving waveform N in which the middle point thereof is set at the referential voltage $V_{REF}$. As shown in FIG. 3, the motor driving waveform N oscillates around the referential voltage $V_{REF}$. Therefore, if the referential voltage $V_{REF}$ is given by the following equation:

$$V_{REF} = \frac{V_{CC} - (V_{BE1} + V_{CE1} + V_{CE2})}{2}$$

where $V_{BE1}$: the base-to-emitter voltages of the transistors Q21, Q25 and Q29

$V_{CE1}$: the collector-to-emitter voltages of the PNP transistors Q20, Q24 and Q28

$V_{CE2}$: the collector-to-emitter voltages of the transistors Q22, Q26 and Q30 with detecting the saturation voltage of the driving transistors Q22, Q26 and Q30 arranged at the lower side, it will be able to drive the driving transistors Q21, Q25 and Q29 arranged at the upper side without saturation. In the present embodiment, the referential voltage $V_{REF}$ is given on the basis of the above equation, thus the driving transistors Q21, Q22, Q25, Q26, Q29 and Q30 are prevented from saturating.

Further, in the above embodiment, the driving transistors Q21, Q25 and Q29 arranged at the upper side form PNP-NPN complementary output circuits in co-operation with the PNP transistors Q20, Q24 and Q28. Though, if the referential voltage $V_{REF}$ is given by the following equation:

$$V_{REF} = \frac{V_{CC} - (V_{CE3} + V_{CE2})}{2}$$

where $V_{CE3}$: the collector-to-emitter voltages of the PNP transistors arranged at the upper side $V_{CE2}$: the collector-to-emitter voltages of the driving transistors arranged at the lower side the driving transistors arranged at the upper side can be formed as a PNP output circuits.

In the above embodiment, the saturation of the driving transistors Q22, Q26 and Q30 arranged at the lower side is detected to adjacent the motor driving output voltages of U~W phases through the amplification circuit 19 and transistors Q45 and Q44 so that the driving transistors Q21, Q25 and Q29 arranged at the upper side can be prevented from saturation. However, the saturation of the driving transistors Q21, Q25 and Q29 arranged at the upper side may be detected to adjacent the motor driving output voltages of U~W phases through the amplification circuit 19 and transistors Q43 and Q44 so that the driving transistors Q22, Q26 and Q30 arranged at the lower side can be prevented from saturation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A brushless motor driver comprising:

a brushless motor having a rotor and driving coils for polyphase operation;

a plurality of drive transistors;

control signal producing means for producing control signals for one of said plurality of drive transistors for each phase of said polyphase operation on the basis of the rotating angle of said rotor;

means for applying a torque command;

current adjusting means for adjusting the value of said transistor drive control signals on the basis of said torque command;

wherein each of said plurality of drive transistors has a collector electrode, an emitter electrode and a control electrode for driving said rotor by controlling an input to said driving coils on the basis of said transistor drive control signals applied to each of said control electrodes;

saturation voltage creating means for creating a saturation voltage corresponding to said torque command; and current correcting means for comparing said saturation voltage created by said saturation voltage creating means with an operating voltage between the collector and emitter electrodes of each of said plurality of driving transistors to change said transistor drive control signals so that said operating voltage drops below said saturation voltage created by said saturation voltage creating means.

2. A brushless motor driver in accordance with claim 1:

said brushless motor driver further comprising a positive feed terminal and a negative feed terminal, said plurality of driving transistors including a group of first driving transistors and a group of second driving transistors, said first driving transistors being connected between said positive feed terminal and each of said driving coils respectively, while said second driving transistors being connected between said negative feed terminal and each of said driving coils respectively, said saturation voltage creating means creating said saturation voltage on the basis of the operating voltage in said first driving transistors and/or said second driving transistors.

3. A brushless motor driver in accordance with claim 2, said brushless motor driver further comprising:

means for supplying a reference voltage; and means for adjusting the amount of the current in said transistor drive control signals being applied to the control electrodes of said first driving transistors and said second driving transistors, through said current adjusting means, so that potentials of the nodes between said first driving transistors and said second driving transistors are the same with said reference voltage respectively.

4. A brushless motor driver in accordance with claim 1, wherein said saturation voltage creating means comprises;

a constant current source for creating a prescribed amount of current corresponding to said torque command; and a resistance connected between said constant current source and said driving transistors, for creating a saturation voltage through a voltage drop of said resistance by a current supplied from said constant current source.

5. A brushless motor driver in accordance with claim 1, wherein said current correcting means comprises;

a constant current source for creating a prescribed amount of current corresponding to said torque command;

a differential transistor pair, which consists of two transistors connected to said constant current source respectively, for distributing the current supplied from said constant current source to said two transistors on the basis of said saturation voltage created by said saturation voltage creating means and said operating voltages of said driving transistors; and a current mirror circuit connected between one transistor of said differential transistor pair and said current adjusting means, for absorbing the current corresponding to the current flowing in said one transistor from said current adjusting means when at least one operating voltage of said driving transistors drops below the saturation voltage created by said saturation voltage creating means.

* * * * *